Patented June 9, 1953

2,641,620

UNITED STATES PATENT OFFICE 2,641,620

PROCESS FOR THE FINISHING OF POLYISOBUTYLENE

Joseph R. Quelly, Cranford, and Stanley A. Sankus, Bayonne, N. J., assignors to Standard Oil Development Company, a corporation of Delaware No Drawing. Application March 18, 1950, Serial No. 150,562

3 Claims. (Cl. 260—683.15)

This invention relates to the purification of polyisobutylene and more particularly relates to the removal of sulfur from liquid isobutylene polymers.

Diisobutylene (dimer) and triisobutylene and other isobutylene polymers are made by the selective absorption of isobutylene from a $C_4$ hydrocarbon cut in 65% sulfuric acid. The extract is heated to promote the isobutylene polymerization. The polymer products are then caustic washed to neutralize entrained sulfuric acid, etc. The crude di-trimer is then fractionated over caustic to recover dimer, trimer, and other polymer products.

Esterification and sulfonation products appear as impurities from side reactions during the extraction with sulfuric acid. The impurities break down during the fractionation process to form corrosive agents such as $SO_2$, mercaptans, etc. This corrosion limits the life of plant fractionating equipment.

Distillation over sodium hydroxide has been used to decrease the quantity of corrosive compounds in the polymer feed stocks but this process has not completely solved the problem. It has also been proposed to remove these sulfur compounds by percolating the polymer through silica gel or bauxite at room temperature. However, these contact materials cause some depolymerization and subsequent repolymerization of the liquid polymers and thus affect the boiling range of the purified product. This boiling range change thus introduced into the product may or may not be important. For certain uses, however, it becomes very important that the product not be contaminated with higher and lower boiling products. This is particularly true when the polymer is to be used for the production of rubber modifiers, as additives, detergents and alcohols (via "oxo" process). The presence of other than $C_{12}$ materials causes production of undesirable properties in the additives, etc. For example, $C_{13}$ alcohols made from $C_{12}$ via the "oxo" process are used as plasticizers. $C_9$ and $C_{17}$ alcohols from $C_8$ and $C_{16}$ olefin (repolymerization and depolymerization products) impart undesirable viscosity to the $C_{13}$ alcohol. Purification of the $C_{13}$ alcohol is difficult in the presence of the other alcohols.

According to the present invention, the sulfur impurities are removed from the isobutylene polymers without impairing the boiling range of the product by percolating the polymer through a carbonaceous material, such as charcoal, chemico coke, bone char, activated carbon, etc.

The following table illustrates the effectiveness of this invention which expresses the quantity of corrosive impurities in terms of mercaptans, sulfonates, esters, etc., calculated as grams sulfur dioxide per gallon of feed per hours of operation using two pounds of activated charcoal per 100 gallons of crude polymer stock:

Gms. $SO_2$/gal./hr. for boiling point ranges of overhead

| Sample No. | Sample | Cuts from Subsequent Fractionations | | | |
|---|---|---|---|---|---|
| | | 100–105 | 105–150 | 150–180 | 180–185 |
| 1 | Untreated crude polymer | .005 | .003 | 1.17 | |
| 2 | Caustic neutralized crude polymer | .0009 | .003 | 1.03 | |
| 3 | Crude polymer refluxed 4 hrs. with NaOH solution. | .003 | .164 | .605 | |
| 4 | Crude polymer percolated thru activated charcoal. | .004 | less than .0002 | .083 | |
| 5 | Crude polymer percolated and caustic neutralized. | .0015 | .001 | .036 | .002 |
| 6 | Unneutralized alkane sulfonic acids | 0.000 | .006 | 7.05 | |
| 7 | Caustic neutralized alkane sulfonic acids. | 0.000 | trace | less than .0002 | |

Effectiveness of ester removal by percolation is demonstrated in the following analysis of samples numbered above as #3 and #5. The comparative figures given are related proportionately to the ester content and do not express directly the ester concentration in the samples.

| Sample No. | Analysis | Boiling Point Range of Sample | | |
|---|---|---|---|---|
| | | 100–105 | 105–150 | 150–180 |
| 3 | Ester | 7.0 | 11.0 | 42.0 |
| 5 | do | 0.0 | 0.0 | 8.0 |

As pointed out above the use of charcoal for removing sulfur impurities from the crude polymer results in substantially no degradation in the boiling point. This is shown in the following table in which tri-isobutylene was percolated through silica gel, attapulgus clay and activated carbon:

| Sample | Purification Method | ASTM Boiling Range After Percolation | |
|---|---|---|---|
| | | IBP, °C. | DP, °C. |
| Original Feed Trimer | None | 177 | 188 |
| Do | Silica Gel Percolation | 86 | 191 |
| Do | Attapulgus Clay Percolation | 175 | 199 |
| Do | Activated Carbon | 176 | 189 |

The nature and objects of the present invention having been thus fully set forth and specific examples of the same given, what is claimed as new and useful and desired to be secured by Letters Patent is:

What is claimed is:

1. A process for removing sulfur impurities including esters and sulfonation products from crude isobutylene polymers which comprises percolating the isobutylene polymers through activated charcoal and neutralizing the percolated polymers by caustic washing.

2. A process for preparing tri-isobutylene of low sulfur content and narrow boiling range from a C$_4$ hydrocarbon cut which comprises selectively extracting isobutylene in 65% sulfuric acid, heating the resulting extract to form isobutylene polymers including tri-isobutylene, percolating the polymers through activated charcoal, caustic neutralizing the percolated polymers and fractionally distilling the neutralized polymers to obtain tri-isobutylene.

3. In the process for preparing low sulfur content dimer and trimer polymers of isobutylene by the selective sulfuric acid absorption and polymerization of isobutylene, the improvement which comprises percolating the isobutylene polymers through activated charcoal, caustic neutralizing the percolated polymers and distilling the neutralized polymers to obtain the desired dimer and trimer polymers.

JOSEPH R. QUELLY.
STANLEY A. SANKUS.

References Cited in the file of this patent

UNITED STATES PATENTS

| Number | Name | Date |
|---|---|---|
| 1,678,298 | Patrick et al. | July 24, 1928 |
| 1,882,146 | Holmes | Oct. 11, 1932 |
| 1,884,495 | Zurcher | Oct. 25, 1932 |
| 1,939,129 | Miller et al. | Dec. 12, 1933 |
| 2,394,678 | Frankel et al. | Feb. 12, 1946 |
| 2,405,905 | Schindler | Aug. 13, 1946 |
| 2,414,760 | Mottern | Jan. 21, 1947 |
| 2,436,550 | Brandon | Feb. 24, 1948 |
| 2,469,726 | Hockberger | May 10, 1949 |